United States Patent [19]
Hoyt et al.

[11] Patent Number: 5,918,046
[45] Date of Patent: *Jun. 29, 1999

[54] METHOD AND APPARATUS FOR A BRANCH INSTRUCTION POINTER TABLE

[75] Inventors: Bradley D. Hoyt; Glenn J. Hinton, both of Portland; David B. Papworth, Beaverton; Subramanian Natarajan, Portland; Reynold V. D'Sa, Aloha, all of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/783,073

[22] Filed: Jan. 15, 1997

Related U.S. Application Data

[63] Continuation of application No. 08/591,233, Jan. 18, 1996, abandoned, which is a continuation of application No. 08/176,795, Jan. 3, 1994, abandoned.

[51] Int. Cl.⁶ ........................................................ G06F 9/40

[52] U.S. Cl. ............................................................ 395/586

[58] Field of Search .................................... 395/581, 586, 395/392, 393, 382

[56] References Cited

U.S. PATENT DOCUMENTS

| | | | |
|---|---|---|---|
| 5,142,634 | 8/1992 | Fite | 395/375 |
| 5,155,843 | 10/1992 | Stamm | 395/575 |
| 5,163,140 | 11/1992 | Stiles | 395/425 |
| 5,355,457 | 10/1994 | Shebanow et al. | 395/394 |
| 5,367,703 | 11/1994 | Levitan | 395/800 |
| 5,434,985 | 7/1995 | Emma | 395/375 |
| 5,442,756 | 8/1995 | Grochowski | 395/375 |
| 5,497,499 | 3/1996 | Garg et al. | 395/375 |
| 5,584,001 | 12/1996 | Hoyt et al. | 395/585 |

OTHER PUBLICATIONS

Smith, "Implementing Precise Interrupts in Pipelined Processore", IEEE 1988, pp. 562–573.

Hiver, "Checkpoint Repair for High—Performance Out-of-Order Execution Machines", IEEE 1987 pp. 1496–1514.

(List continued on next page.)

*Primary Examiner*—David Y. Eng
*Attorney, Agent, or Firm*—Blakely, Sokoloff, Taylor & Zafman

[57] ABSTRACT

A buffer is used to store information about the branch instructions within a pipelined microprocessor that can speculatively execute instructions. When a branch instruction in the microprocessor is decoded, the address of the instruction immediately following the branch instruction (the Next Linear Instruction Pointer or NLIP) and some processor state information is written into a Branch Instruction Pointer Table. The branch instruction then proceeds down the microprocessor pipeline. Eventually, the branch instruction is executed. The resolved branch outcome for the branch instruction is compared with a predicted branch outcome. If the branch prediction was correct, the microprocessor continues execution along the current path. However, if the branch prediction was wrong then the execution unit flushes the front-end microprocessor pipeline and restores the microprocessor state information that was stored in the Branch IP Table. If the branch was mispredicted as not taken, the execution unit instructs an Instruction Fetch Unit to resume execution at a final branch target address. Alternatively, if the branch was mispredicted as taken when the branch should not have been taken, the execution unit instructs the Instruction Fetch Unit to resume execution at the Next Linear Instruction Pointer (NLIP) address stored in the Branch IP Table.

20 Claims, 7 Drawing Sheets

OTHER PUBLICATIONS

Popescu, "The Metaflow Architecture", IEE Micro, Jun. 1991, vol. 11, No. 3. pp. 10–13 & 63–72.

J. Smith, "Implementing Precise Interrupts in Pipelined Processors", IEEE vol. 37, No. 5 May 1988, pp. 562–573.

Proceedings from The 19th Annual International Symposium on Computer Architecture, published 1992 by Association for Computing Machinery, New York, pp. 124–134, Entitled: Alternative Implementations of Two–Level Adaptive Branch Prediction, Authors: Tse–Yu Yeh and Yale N. Patt.

Publication: Computer, published Jan. 1984, pp. 6–22, Entitled: Branch Prediction Strategies and Branch Target Buffer Design, Authors: Johnny K.F. Lee, Hewlett–Packard and Alan Jay Smith, University of California, Berkeley.

Published by the Association for Computing Machinery, 1992, pp. 76–84, Entitled: Improving the Accuracy of Dynamic Branch Prediction Using Branch Correlation, Authors: Shien–Tai Pan and Kimming So, IBM Corp., and Joseph T. Rahmeh, University of Texas, Austin.

Published by the Association for Computing Machinery, 1991, pp. 51–61, Entitled: Two–Level Adaptive Training Branch Prediction, Authors: Tse–Yu Yeh and Yale N. Patt, University of Michigan.

Published by Prentice Hall, 1991, pp. 57–85, 261–273, Entitled: Superscalar Microprocessor Design, Author: Mike Johnson, Advanced Micro Devices.

IEEE Micro, Published Jun., 1991, pp. 10–13, and 63–73, Authors: Val Popescu, et al., Entitled: The Metaflow Architecture.

| pDst Entry Number | V | RESULT DATA | FLAGS | FLAG MASK | LDST | FAULT |
|---|---|---|---|---|---|---|
| 0 | | | | | | |
| 1 | | | | | | |
| 2 | | | | | | |
| 3 | | | | | | |
| 4 | | | | | | |
| 5 | | | | | | |
| n-1 | | | | | | |

RECORDER BUFFER (ROB)
[83]

Figure 3

| BIT Entry Number | Next Linear Instruction Pointer (NLIP) | Processor State Information |
|---|---|---|
| 0 | | |
| 1 | | |
| 2 | | |
| 3 | | |
| ⋮ | ⋮ | ⋮ |
| | | |
| | | |
| | | |
| n-1 | | |

Branch IP Table (BIT)
[43]

METHOD AND APPARATUS FOR A BRANCH INSTRUCTION POINTER TABLE

This is a continuation of application Ser. No. 08/591,233, filed Jan. 18, 1996, which was a continuation of application Ser. No. 08/176,795, filed Jan. 3, 1994, both now abandoned.

FIELD OF THE INVENTION

This invention relates to branch prediction mechanisms in pipelined microprocessors. More specifically to a storage mechanism that stores information about a branch prediction at an early stage in the microprocessor pipeline for later use near the end of the microprocessor pipeline.

ART BACKGROUND

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waits until all the previous logic blocks complete operations before beginning its operation.

To improve efficiency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock tick the results of each processing stage are passed to the following processing stage. Microprocessors that use the technique of overlapping the fetch, decode, execute, and writeback stages are known as "pipelined" microprocessors. Some microprocessors divide each processing stage into substages for further performance improvement. Such processors are referred to as "deeply pipelined" microprocessors.

In order for a pipelined microprocessor to operate efficiently, an Instruction Fetch Unit at the head of the pipeline must continually provide the pipeline with a stream of instructions. However, conditional branch instructions within an instruction stream prevent the Instruction Fetch Unit from fetching subsequent instructions until the branch condition is resolved. In pipelined microprocessor, the branch condition will not be resolved until the branch instruction reaches an instruction execution stage further down the pipeline. The Instruction Fetch Unit must stall since the branch condition is unresolved at the instruction fetch stage and therefore the Instruction Fetch Unit does not know which instructions to fetch next.

To alleviate this problem, many pipelined microprocessors use branch prediction mechanisms that predict the outcome of branch instructions within an instruction stream. The Instruction Fetch Unit uses the branch predictions to fetch subsequent instructions. For example, Yeh & Patt introduced a highly accurate two-level adaptive branch prediction mechanism. (See Tse Yu Yeh and Yale N. Patt, *Two-Level Adaptive Branch Prediction*, The 24th ACM/IEEE International Symposium and Workshop on Microarchitecture, November 1991, pp. 51–61) The Yeh & Patt branch prediction mechanism makes branch predictions based upon two levels of collected branch history.

When a branch prediction mechanism predicts the outcome a branch instruction and the microprocessor executes subsequent instructions along the predicted path, the microprocessor is said to have "speculatively executed" along the predicted instruction path. During speculative execution the microprocessor must not permanently commit any changes in state since the microprocessor may be executing down the wrong path due to a branch misprediction.

When the branch prediction mechanism mispredicts a branch, an instruction execution unit further down the pipeline eventually detects the branch misprediction. After the instruction execution unit detects a branch misprediction, the instructions that should not have been fetched are flushed out of the microprocessor pipeline and program execution resumes along the corrected instruction path. To properly resume execution along the correct path, the microprocessor must restore any microprocessor state changes that occurred during speculative execution. Furthermore, the microprocessor must obtain the address of the instruction that should have been executed after the branch instruction.

If a branch instruction should have been taken and was mispredicted as not-taken, then the address of the next instruction is the target address of the branch instruction. Thus, after branch that was wrongly predicted not-taken, the microprocessor can resume execution along the correct instruction path by fetching the instruction at the branch instruction's target address. This procedure is relatively simple since the target address is usually specified by the branch instruction and its associated operand.

However, if a branch instruction should have been not-taken and was mispredicted as taken, then the address of the next instruction is the address of the instruction located after the branch instruction. This case is more difficult than the previous case since the address of the next instruction is not specified by the branch instruction or its associated operand. Thus, to resume execution after a branch instruction wrongly predicted as taken, the microprocessor might be required to propagate the address of the instruction located after the branch instruction along the microprocessor pipeline to the instruction execution unit. Once the instruction execution unit executes the branch instruction, the address of the instruction located after the branch instruction will be used if the branch was mispredicted or else the address is dropped. To carry both the branch target address and the address of the instruction located after the branch instruction, the microprocessor pipeline must be constructed very wide and thus use a considerable amount of die area.

SUMMARY OF THE INVENTION

It is therefore an object of the present invention to provide a mechanism that stores the address of the instruction located after a branch instruction, also known as Next Linear Instruction Pointer (NLIP), for each branch instruction currently within the microprocessor. The Next sequential Instruction Pointer can be retrieved and used if the branch instruction is mispredicted taken. Furthermore, the branch prediction mechanism can use the Next sequential Instruction Pointer as an index into a Branch Target Buffer that stores information about branch instructions.

It is a further object of the present invention to provide a branch storage mechanism that stores some microprocessor state information at the time of a branch prediction. If the microprocessor later determines that the branch instruction was mispredicted, the microprocessor can restore itself with the stored state information.

These and other objectives are accomplished by the Branch Instruction Pointer Table of the present invention that stores information about the branch instructions in the microprocessor. According to the teachings of the present invention, when a macro branch is decoded, the address of the instruction immediately following the branch instruction (the Next Linear Instruction Pointer or NLIP) and some processor state information is written into a buffer called a Branch IP Table. The branch instruction then proceeds down the microprocessor pipeline. Eventually, a Branch Execution Unit resolves the branch instruction. The Branch Execution Unit compares the resolved branch outcome with the predicted branch outcome. If the branch prediction was correct, the microprocessor continues execution along the current path.

However, if the branch prediction was wrong then the execution unit flushes the instructions in the front-end of the microprocessor pipeline and restores the microprocessor state information that was stored in the Branch IP Table. If the branch was mispredicted as not taken, the execution unit instructs an Instruction Fetch Unit to resume execution at the branch target address as calculated by the execution unit. Alternatively, if the branch was mispredicted as taken when the branch should not have been taken, the execution unit instructs the Instruction Fetch Unit to resume execution at the Next Linear Instruction Pointer (NLIP) address stored in the Branch IP Table.

When the execution unit resolves a branch, the execution unit may need to update an entry in a Branch Target Buffer or allocate a new entry in the Branch Target Buffer. If an entry for the branch already exists in the Branch Target Buffer, then the entry needs to be updated. If the branch is not in the Branch Target Buffer and the branch meets the requirements of a Branch Target Buffer allocation policy, then an entry for the branch should be allocated in the Branch Target Buffer. In either case, the Next Linear Instruction Pointer (NLIP) address can be decremented to obtain the address of the last byte of the branch instruction. The address of the last byte of the branch instruction is used as an index into the Branch Target Buffer.

BRIEF DESCRIPTION OF THE DRAWINGS

The objects, features and advantages of the present invention will be apparent to one skilled in the art, in view of the following detailed description in which:

FIG. 3 is a diagram of a reorder buffer that stores the results of executed micro operations.

FIG. 4 is a diagram of a Branch IP Table that stores information about each branch prediction in the microprocessor for use near the end of the microprocessor pipeline.

DETAILED DESCRIPTION OF THE INVENTION

A branch storage mechanism that stores information about each branch instruction at a decode stage in a microprocessor pipeline for later use near the end of the microprocessor pipeline is disclosed. In the following description, for purposes of explanation, specific nomenclature is set forth to provide a thorough understanding of the present invention. However, it will be apparent to one skilled in the art that these specific details are not required in order to practice the present invention. For example, the present invention is disclosed in this specification with reference to a speculative out-of-order processor. However, any type processor that speculatively executes instructions can utilize the teachings of the present invention. Furthermore, well known circuits and devices are shown in block diagram form in order not to obscure the present invention unnecessarily.

A Deeply Pipelined Processor

Figure 1:
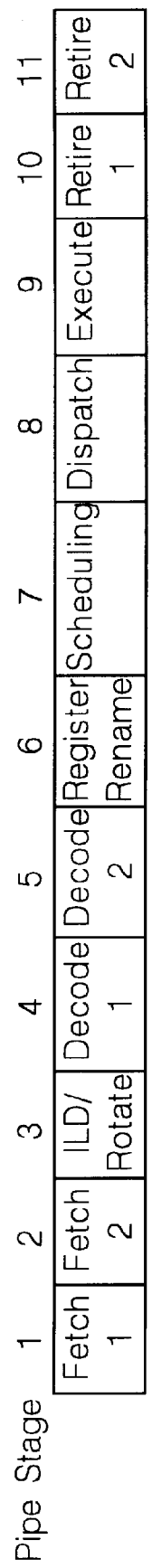
FIG. 1 is a block diagram of a deep microprocessor pipeline for processing instructions.
Figure 2:
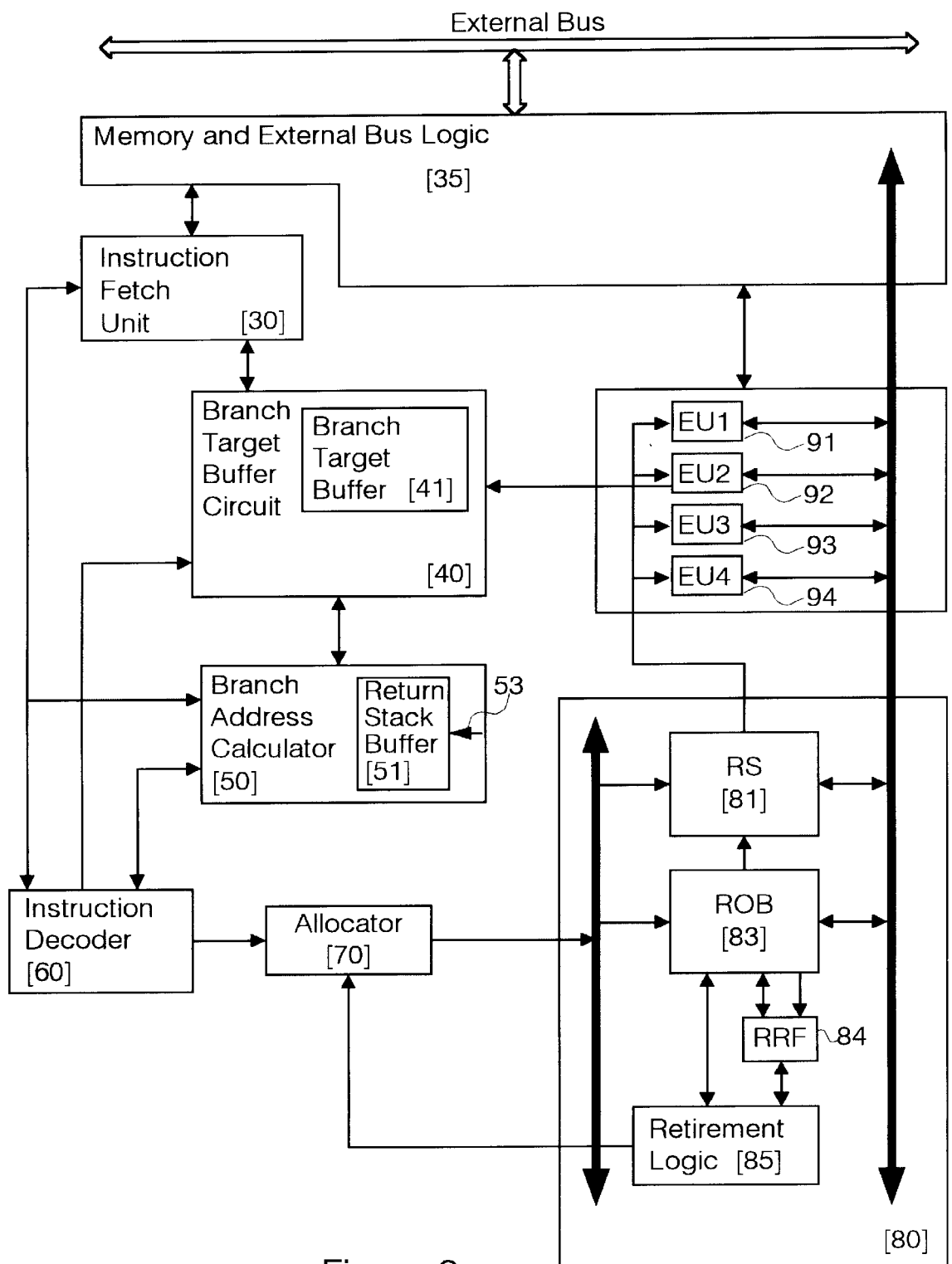
FIG. 2 is a block diagram of the different circuit blocks in a microprocessor that implements the deep pipeline illustrated in FIG. 1.

In a deeply pipelined processor, the major stages of a pipelined processor such as instruction fetch, instruction decode, and instruction execute, are divided into several different substages such that each processing stage is pipelined. This results in a long instruction pipeline. For example, FIG. 1 illustrates a set of pipeline stages that define one particular deeply pipelined processor. In the instruction pipeline of FIG. 1, the instruction processing is divided into 11 pipeline stages. To implement the pipeline of FIG. 1, several distinct logic circuits are required. FIG. 2 illustrates, in block diagram form, the major logic circuits of a microprocessor that implements the deep pipeline illustrated in FIG. 1.

At the top of the block diagram of FIG. 2 is Memory & Bus Logic 35. The Memory & Bus Logic 35 is responsible for loading information into the microprocessor and outputting information from the microprocessor. The Memory & Bus Logic 35 usually first attempts to load or store from a high speed cache memory. If the cache memory cannot be used (perhaps due to a cache 'miss'), the Memory & Bus Logic 35 instead accesses a main memory over an external bus.

Coupled to the Memory & Bus Logic 35 is an Instruction Fetch Unit 30. The Instruction Fetch Unit 30 is responsible for continually fetching new microprocessor instructions (also known as macro instructions) and operands for the microprocessor to execute. The Instruction Fetch Unit 30 uses an instruction pointer (IP) to maintain the current fetch address. The fetched instructions are fed into the head of the instruction pipeline. Simple unconditional branch instructions within the instruction stream prevent the Instruction Fetch Unit 30 from simply fetching instructions along a sequential path. Furthermore, conditional branch instructions within the instruction stream prevent the Instruction Fetch Unit 30 from simply fetching instructions along a predefined path since the condition must be resolved to determine the path.

To help fetch the correct instructions, the Instruction Fetch Unit 30 consults a Branch Target Buffer Circuit 40 that predicts the execution path of an instruction stream. The Branch Target Buffer Circuit 40 operates by predicting the existence of branch instructions within the instruction stream, and predicting the outcome of those branch instructions. When the Branch Target Buffer Circuit 40 predicts a taken branch instruction, the Branch Target Buffer Circuit 40 notifies the Instruction Fetch Unit 30 to such that the Instruction Fetch Unit 30 begins fetching instructions at a branch target address predicted by the Branch Target Buffer Circuit 40.

The Branch Target Buffer Circuit 40 makes its predictions based upon branch instructions that have previously been executed by the microprocessor. Each time a branch instruction is resolved by the microprocessor, the Branch Target Buffer Circuit 40 records the location of the branch instruction and outcome of the branch in a Branch Target Buffer Cache 41 for future reference. Upon subsequent occurrences of the branch instruction, the Branch Target Buffer Circuit 40 will make a branch prediction based upon the branch history collected within the Branch Target Buffer Cache 41.

The Instruction Decoder 60 is responsible for determining what type of microprocessor instruction is received and breaking down the microprocessor instruction into one or more micro-operations (hereinafter referred to as micro-ops) with associated micro-operands. The one or more micro-ops corresponding to a microprocessor instruction perform the function of the corresponding microprocessor instruction.

If the Instruction Decoder 60 determines that a received microprocessor instruction is a branch instruction, then the Instruction Decoder 60 passes certain information about the branch instruction to a Branch Address Calculator 50 for special treatment. The Branch Address Calculator 50 checks the microprocessor instruction to ensure that it is a branch instruction. If the Branch Target Buffer Circuit 40 made a branch prediction when no branch instruction existed, the Branch Address Calculator 50 flushes the pipeline and instructs the Instruction Fetch Unit 30 to resume execution at the address after the instruction that the Branch Target Buffer Circuit 40 predicted to be a branch instruction. The Instruction Decoder 60 also instructs the Branch Target Buffer Circuit 40 to invalidate the branch entry that caused erroneous branch prediction.

The Branch Address Calculator 50 also performs other operations on branch instructions. The Branch Address Calculator 50 calculates the branch target address for relative branch instructions. If the calculated branch target address does not equal the target address predicted by the Branch Target Buffer Circuit, then Branch Address Calculator 50 flushes the pipeline and instructs the Instruction Fetch Unit 30 to resume execution at the corrected target address. Furthermore, the Branch Address Calculator 50 identifies all "call subroutine" and "return from subroutine" instructions and handles these instructions using a Return Stack Buffer that contains a stack of return addresses. When the Branch Address Calculator 50 completes its operations, the Branch Address Calculator 50 passes the processed branch information to the Instruction Decoder 60.

After breaking down the microprocessor instruction into a set of micro-ops, the Instruction Decoder 60 passes the micro-ops along to an Allocator 70. The Allocator 70 allocates the processor resources necessary to execute each micro-op. In the present embodiment, the microprocessor is a superscalar processor may execute the micro-ops out of the original program order. However, the micro-ops must eventually be retired in the original program order to properly execute the computer program.

To maintain the original program order, the Allocator 70 allocates an entry in a reorder buffer 83 in an Out of Order logic circuit 80. FIG. 3 illustrates a reorder buffer. The reorder buffer 83 of FIG. 3 comprises a circular buffer that contains n entries wherein each entry stores result information about a micro-op. Since each entry in the reorder buffer 83 provides a destination where the micro-op result data can physically be put, each reorder buffer 83 is referred to as a physical destination (or pDst for short). The pDsts within the reorder buffer 83 are numbered 0 through n−1. Referring to FIG. 3, each pDst in the reorder buffer 83 contains fields for a valid bit that indicates if the micro-op result is valid, a micro-op result, a set of flags affected by the micro-op, a mask for the flags, a code that indicates what the results mean, and fault data.

For each micro-op, the Allocator 70 allocates the next available pDst in the reorder buffer 83. By sequentially allocating the pDsts in the reorder buffer 83 in the same order the micro-ops are received, the original program order of the micro-op results will be maintained.

Referring back to FIG. 2, the Allocator 70 also allocates an entry in the reservation station 81 for each micro-op. The reservation station 81 entry stores a valid bit that indicates if the entry is valid, the micro-op instruction code, two source data fields, two valid bits for the source data fields, two physical source fields that indicate where the source data will come from if the source data is not valid, and a physical destination of the result of the micro-op. After the Allocator 70 allocates a reservation station entry and a pDst in the reorder buffer 83, each micro-op waits at the reservation station 81 entry until it is executed.

Each micro-op in a reservation station 81 entry remains at the reservation station 81 entry until all the source data required to execute the micro-op has been obtained and an execution unit for executing the micro-op is ready. When all the source data required for a micro-op is ready and an execution unit is available, the reservation station 81 dispatches the micro-op to the execution unit in the execution cluster 90. In the present embodiment, there are four execution units (EU1 91, EU2 92, EU3 93, and EU4 94) in the execution logic circuit 90. After an execution unit executes a micro-op, the execution unit writes the result data, the architectural flags, and any fault information into the reorder buffer 83 pDst that the Allocator 70 allocated for the micro-op.

Finally, a retirement circuit 85 retires the results that are stored in the reorder buffer 83 pDsts from each executed micro-op. The retirement circuit 85 retires the reorder buffer 83 pDsts by sequentially going through the pDsts in the reorder buffer 83 in the same order that the Allocator 70 allocated the pDsts. The retirement circuit 85 retires pDsts by transferring the micro-op results into a Real Register File (RRF) 84 that stores the current committed architectural state. Since the Allocator 70 allocated the reorder buffer 83 pDsts in original program order and the retirement circuit 85 retires the micro-op results in the reorder buffer 83 pDsts in the same order, original program order is maintained even though micro-ops may be executed out of the original program order.

To retire a micro-op, the retirement circuit 85 tests the valid bit of a reorder buffer 83 pDst entry to see if the pDst contains a valid executed micro-op result. If the valid bit for the pDst is set, the retirement circuit 85 checks the fault field of the pDst to see if a fault must be handled. If the reorder buffer 83 pDst contains a valid executed micro-op result and there is no fault problem, then the executed micro-op result is committed to permanent architectural state in the Real Register File (RRF) 84.

Branch Instruction Processing

To illustrate how the microprocessor depicted in FIG. 2 handles branch instructions, the flow of a branch instruction through the processor pipeline is provided with reference to FIG. 2. Starting at the Instruction Fetch Unit 30 in FIG. 2, the Instruction Fetch Unit 30 normally fetches instructions sequentially. However, the Instruction Fetch Unit 30 may receive branch prediction from the Branch Target Buffer Circuit 40 that predicts a change in the execution path.

When the Branch Target Buffer Circuit 40 predicts a taken branch instruction, the Instruction Fetch Unit 30 starts fetching subsequent instructions from a branch target address provided by the Branch Target Buffer Circuit 40. Furthermore, when the Branch Target Buffer Circuit 40 predicts a branch, the Instruction Fetch Unit 30 passes the branch instruction and the branch prediction made to the Instruction Decoder 60.

When the Instruction Decoder 60 receives the branch instruction, the Instruction Decoder 60 first verifies that the instruction predicted by the Branch Target Buffer Circuit 40 actually is a branch instruction. If the instruction is not a branch instruction, the Instruction Decoder 60 flushes the front-end of the microprocessor pipeline and restarts execution at the address immediately following the instruction that the Branch Target Buffer Circuit 40 predicted to be a branch instruction.

If the Instruction Decoder 60 determines that the received microprocessor instruction is a branch instruction, then the Instruction Decoder 60 passes certain information about the branch instruction to a Branch Address Calculator 50 for special treatment. Specifically, the Instruction Decoder 60 tells the Branch Address Calculator 50 what type of branch instruction has been received, the branch's displacement, and the Branch Target Buffer Circuit's outcome and target address prediction.

In the present embodiment, the branch instruction may be one of four types of branch instructions: Unconditional Relative Jump/Call, Unconditional Register Indirect Jump/Call, Conditional Jump, or Return from Subroutine. Each type of branch instruction is handled differently by the Branch Address Calculator 50.

The following Table 1 illustrates how the Branch Address Calculator 50 handles each type of branch instruction when the Branch Target Buffer Circuit 40 predicted the branch instruction and the Instruction Decoder 60 verified that the predicted branch instruction actually is a branch instruction. (As stated earlier, if the Instruction Decoder 60 determines that a predicted branch instruction is not a branch instruction, then the Branch Address Calculator 50 flushes the microprocessor pipeline)

TABLE 1

| | Branch Address Calculator Action | |
|---|---|---|
| Branch Type (As decoded by ID) | Validation of the BTB Branch Outcome | Validation of the Branch Target Address |
| Unconditional Relative Jump or Call | Yes, taken | Yes, target calculated from IP and branch displacement |
| Register indirect Jump or Call | Yes, taken | No, just use BTB address prediction |
| Conditional Jump | No, condition unknown | Yes, target calculated from IP and branch displacement |
| Return from subroutine | Yes, taken | Yes, from BAC return stack buffer |

When the Branch Address Calculator 50 receives an Unconditional Relative Jump or Call instruction that was predicted by the Branch Target Buffer Circuit 40, the Branch Address Calculator 50 validates both the predicted branch outcome and the predicted branch target address. Since the branch is unconditional, the Branch Target Buffer Circuit 40 validates the branch outcome by ensuring the branch was predicted taken. The Branch Address Calculator 50 validates the branch target address by calculating the Instruction Pointer relative target address and comparing the calculated branch target address with to the predicted branch target address. If either the branch outcome or branch target address were mispredicted, the Branch Address Calculator 50 flushes the pipeline and restarts the machine at the corrected address. Since the Branch Address Calculator 50 fully validates both the predicted branch outcome and the predicted branch target address for Unconditional Relative Jump or Call instructions, such branch instructions are fully executed. Thus, the Branch Execution Unit will not need to perform any work on such instructions.

When the Branch Address Calculator 50 receives an Unconditional Register Indirect Jump or Call instruction that was predicted by the Branch Target Buffer Circuit 40, the Branch Address Calculator 50 validates the predicted branch outcome. Since the branch is unconditional, the Branch Address Calculator 50 validates the predicted branch outcome by ensuring the branch instruction was predicted taken. The Branch Address Calculator 50 cannot validate the branch target address since the value within the register is not known at this stage in the microprocessor pipeline. The Branch Address Calculator 50, therefore, makes no adjustment to the branch target address predicted by the Branch Target Buffer Circuit 40. The Branch Execution Unit must verify the branch target address predicted by the Branch Target Buffer Circuit 40.

When the Branch Address Calculator 50 receives a Conditional jump instruction that was predicted by the Branch Target Buffer Circuit 40, the Branch Address Calculator 50 validates only the branch target address. The Branch Address Calculator 50 validates the branch target address by calculating the branch target address and comparing the calculated branch target address with the predicted branch target address. The Branch Address Calculator 50 does not validate the branch outcome since the outcome of branch condition is not known at this stage in the microprocessor.

When the Branch Address Calculator 50 receives a Return from Subroutine instruction that was predicted by the Branch Target Buffer Circuit 40, the Branch Address Calculator 50 validates both the predicted branch outcome and the predicted branch target address. Since a Return from Subroutine instruction is unconditional, the Branch Target Buffer Circuit 40 validates the branch outcome by ensuring the branch instruction was predicted taken. The Branch Address Calculator 50 validates the branch target address by accessing a buffer called the Return Stack Buffer 51.

The Return Stack Buffer 51 operates by monitoring all "Call subroutine" and "Return from subroutine" branch instructions. When the Branch Address Calculator 50 detects a "Call subroutine" branch instruction, the Branch Address Calculator 50 pushes the address of the next instruction onto the Return Stack Buffer 51. A Top of Stack Pointer 53 marks the top of the Return Stack Buffer 51. By pushing the address immediately following each "Call subroutine" instruction onto the Return Stack Buffer 51, the Return Stack Buffer 51 will contain a stack of return addresses. When the Branch Address Calculator 50 later detects a "Return from subroutine" branch instruction, the Branch Address Calculator 50 pops the top return address off of the Return Stack Buffer 51 to verify the return address predicted by the Branch Target Buffer Circuit 40. A detailed description of the Return Stack Buffer 51 is provided in the copending patent application "Method and Apparatus for Resolving Return From Subroutine Instructions in a Computer Processor", Ser. No. 08/176,065, filed Jan. 4, 1994.

After completing its operations, the Branch Address Calculator 50 returns the processed branch instruction to the Instruction Decoder 60. The Instruction Decoder 60 decodes the branch instruction into a set of micro-ops and passes the branch micro-ops to the Allocator 70. As the Instruction Decoder 60 passes the branch micro-ops to the Allocator 70. For each micro-op, the Allocator 70 assigns the next available pDst entry in the reorder buffer 83 to store result information about the branch micro-op. Furthermore, the Allocator 70 allocates an entry in the reservation station 81 for each micro-op and sends the micro-op to the reservation station 81 entry.

The branch micro-op remains at the reservation station 81 entry until all the source data required to execute the branch micro-op is ready and an execution unit that handles branch instructions is available. When the source data required to execute the branch micro-op is ready, the reservation station 81 sends the branch micro-op to the execution unit that handles branch micro-ops. In the present embodiment, an integer execution unit (EU2 92) handles all the branch micro-ops. This execution unit is also known as the Branch Execution Unit 92.

The Branch Execution Unit 92 executes the branch micro-op to determine a final branch outcome (taken or not-taken) and a final branch target address. The Branch Execution Unit 92 compares the final branch outcome and final branch target address with the predicted branch outcome and predicted branch target address to see if the branch prediction was correct. If the branch prediction was correct, then the processor can continue along the predicted path. However, if the branch prediction was wrong, then the execution unit must flush the pipeline and restart the processor at the correct address. A more detailed description of the processing performed by the Branch Execution Unit 92 is provided in the copending patent application "Method and Apparatus for Implementing A Four Stage Branch Resolution System in a Computer Processor", Ser. No. 08/176,785, filed Jan. 3, 1994 and is hereby. incorporated by reference.

A branch instruction can be mispredicted in one of three ways. First, the branch instruction may be predicted not taken when the branch actually should have been taken; second, the outcome of a branch instruction may be predicted correctly but an incorrect branch target address may have been predicted; and third, the branch instruction may be predicted taken when the branch instruction should not have been taken. In the first two situations, the mispredicted branch can be easily cured by flushing the microprocessor pipeline and providing the Instruction Fetch Unit with the final branch target address.

However, in the third situation the processor must resume execution starting at the address that follows the mispredicted branch instruction to recover from the branch misprediction. Thus, in the third situation, the Instruction Fetch Unit 30 must somehow be provided with the address of the instruction after the mispredicted branch.

A simple method of providing the Instruction Fetch Unit 30 with the address of the instruction immediately following the mispredicted branch would be to propagate that address down the microprocessor pipeline along with the branch instruction. However, this solution is not very efficient. In order to implement such a solution the microprocessor pipeline would have to carry the branch micro-op, the branch target address information, and the address of the instruction immediately following the branch instruction. Carrying all this information down the microprocessor pipeline would require a very wide microprocessor pipeline. Since most instructions do not require so much information, it is desirable to find a solution other than creating a very wide microprocessor pipeline.

The Branch IP Table

To restart the microprocessor after mispredicting a branch instruction as taken when the branch instruction should have been predicted not-taken, the present invention introduces the concept of a Branch Instruction Pointer (IP) Table. The Branch IP Table comprises a buffer that stores information about each unresolved macro branch instruction that is currently within the microprocessor.

FIG. 4 illustrates the Branch IP Table 43 of the present invention. The Branch IP Table 43 comprises a buffer containing n branch information entries (0 to n-1) wherein n equals the number of entries in the Reorder Buffer 83. Each branch information entry within the Branch IP Table 43 comprises a Next Linear Instruction Pointer (NLIP) address field and a processor state information field.

The Next Linear Instruction Pointer (NLIP) address field stores the address of the instruction immediately following the branch instruction. The Branch Execution Unit 92 uses the NLIP address when a branch misprediction occurs that predicts a branch instruction as taken when the branch instruction should not have been taken. The NLIP address is also used by the Branch Target Buffer Circuit 40 to update/ allocate branch history information in the Branch Target Buffer Cache 41 after each branch micro-op executes.

The processor state information field is used to store some processor state information that may be corrupted when the microprocessor begins speculative execution after making a branch prediction. If the microprocessor is speculatively executing down the wrong path due to a branch misprediction, the microprocessor state information can be restored from the Branch IP Table 43 after the misprediction is detected. In the present embodiment, the microprocessor state information field stores the value of the Return Stack Buffer Top Of Stack Pointer (TOS) 53 when the branch instruction was processed by the Branch Address Calculator 50.

Figure 5:
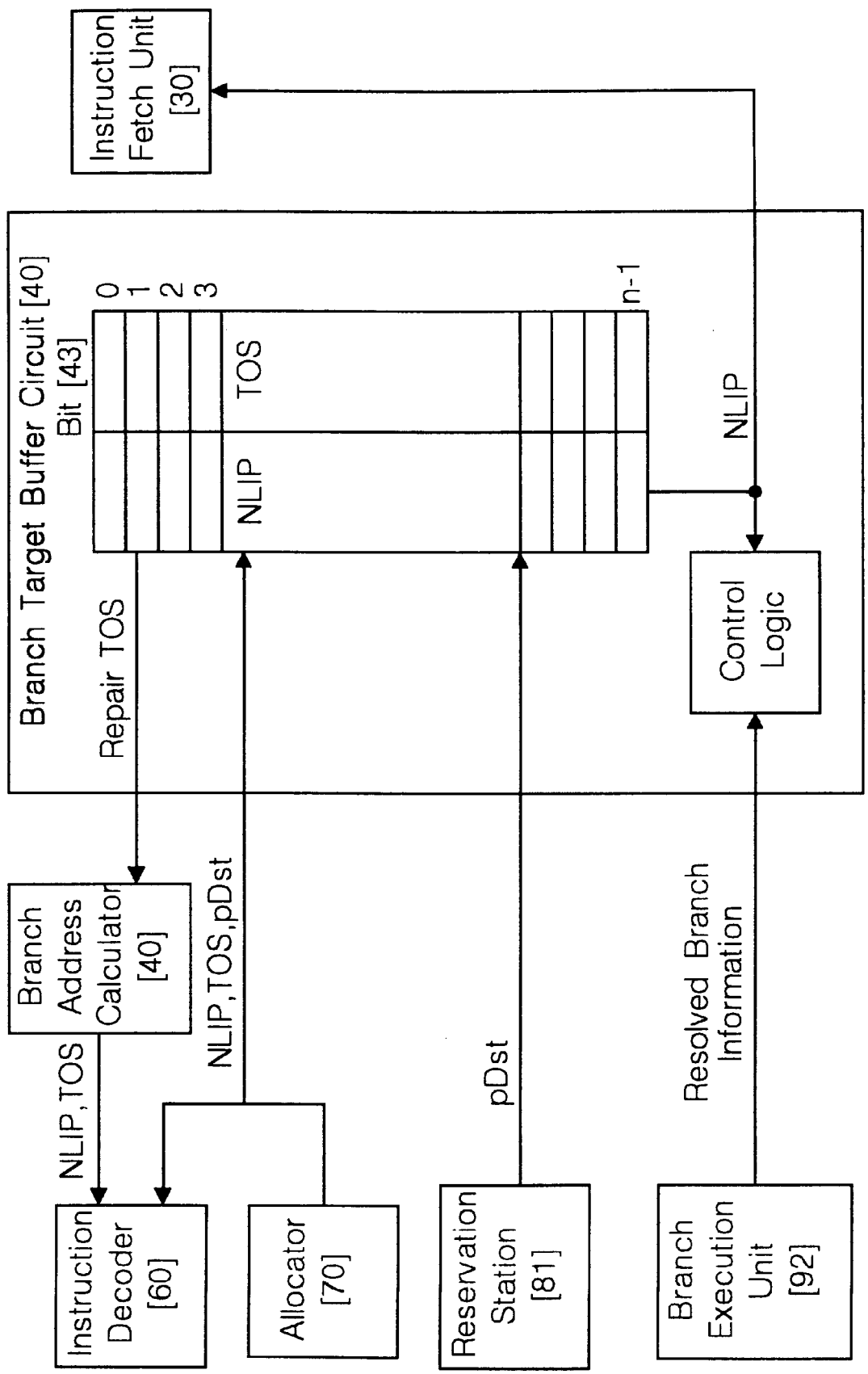
FIG. 5 is a block diagram of the Branch IP Table and the other elements of the microprocessor of FIG. 2 that interact with the Branch IP Table.

Referring to FIG. 5, the Branch IP Table 43 is located within the Branch Target Buffer Circuit 40. The Branch IP Table 43 is maintained by the Branch Target Buffer Circuit 40 with help provided by other logic circuits such as the Instruction Decoder 60, the Branch Address Calculator 50, the Allocator 70, the Reservation Station 83, and the Branch Execution Unit 92.

The Branch Address Calculator 50 supplies the Instruction Decoder 60 with the NLIP address and current Top Of Stack Pointer (TOS) 53 for each branch instruction. When the Allocator 70 allocates a reorder buffer pDst entry, the Instruction Decoder 60 uses this pDst value to write a corresponding entry in the Branch IP Table 43 that will store the NLIP address and current TOS value for each branch instruction.

When the Reservation Station 83 issues a branch micro-op to the Branch Execution Unit 92, the Reservation Station 83 informs the Branch Target Buffer Circuit 40 which pDst entry will be used to store the branch result. Using the pDst value, the Branch Target Buffer Circuit 40 reads out the corresponding entry in the Branch IP Table 43.

After the branch micro-op has executed, the Branch Execution Unit 92 passes information about the resolved branch to the Branch Target Buffer Circuit 40. The Branch Target Buffer Circuit 40 then processes the information about the branch instruction read out the Branch IP Table 43 and the resolved branch information from the Branch Execution Unit 92. If the branch instruction was mispredicted, then the stored TOS value from the Branch IP Table 43 is sent back to the Branch Address Calculator 50 to restore its pre-speculative execution state. If the branch instruction was mispredicted taken, the NLIP address from the Branch IP Table 43 is sent to the Instruction Fetch Unit 30 to restart processing at the address of the instruction immediately following the mispredicted branch instruction. The NLIP address is also used to update an existing entry or allocate a new entry in the Branch Target Buffer Cache 41.

Figure 6:
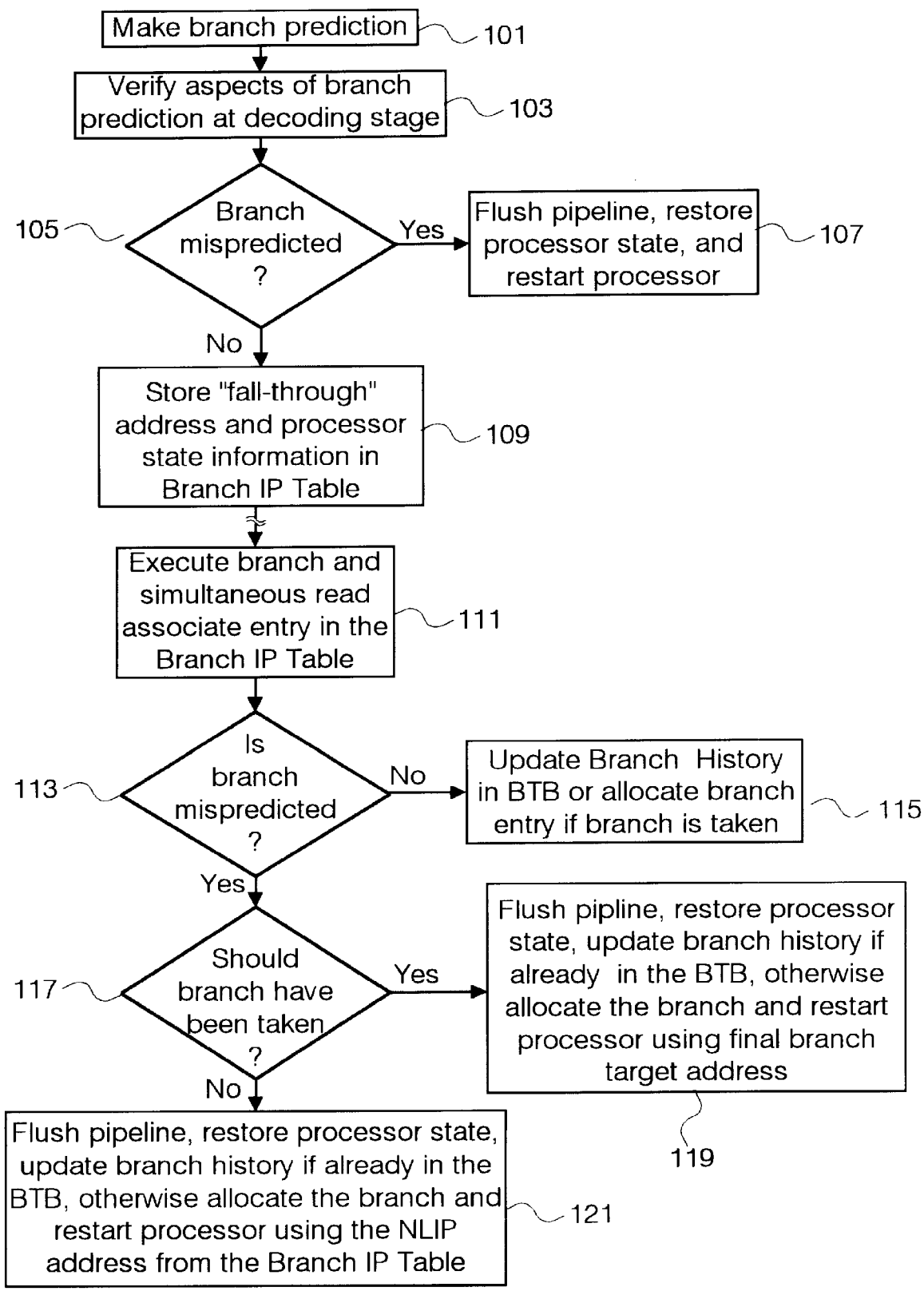
FIG. 6 is a flow diagram that describes how the Branch IP Table is used to restore processor state after branch misprediction.
Figure 7:
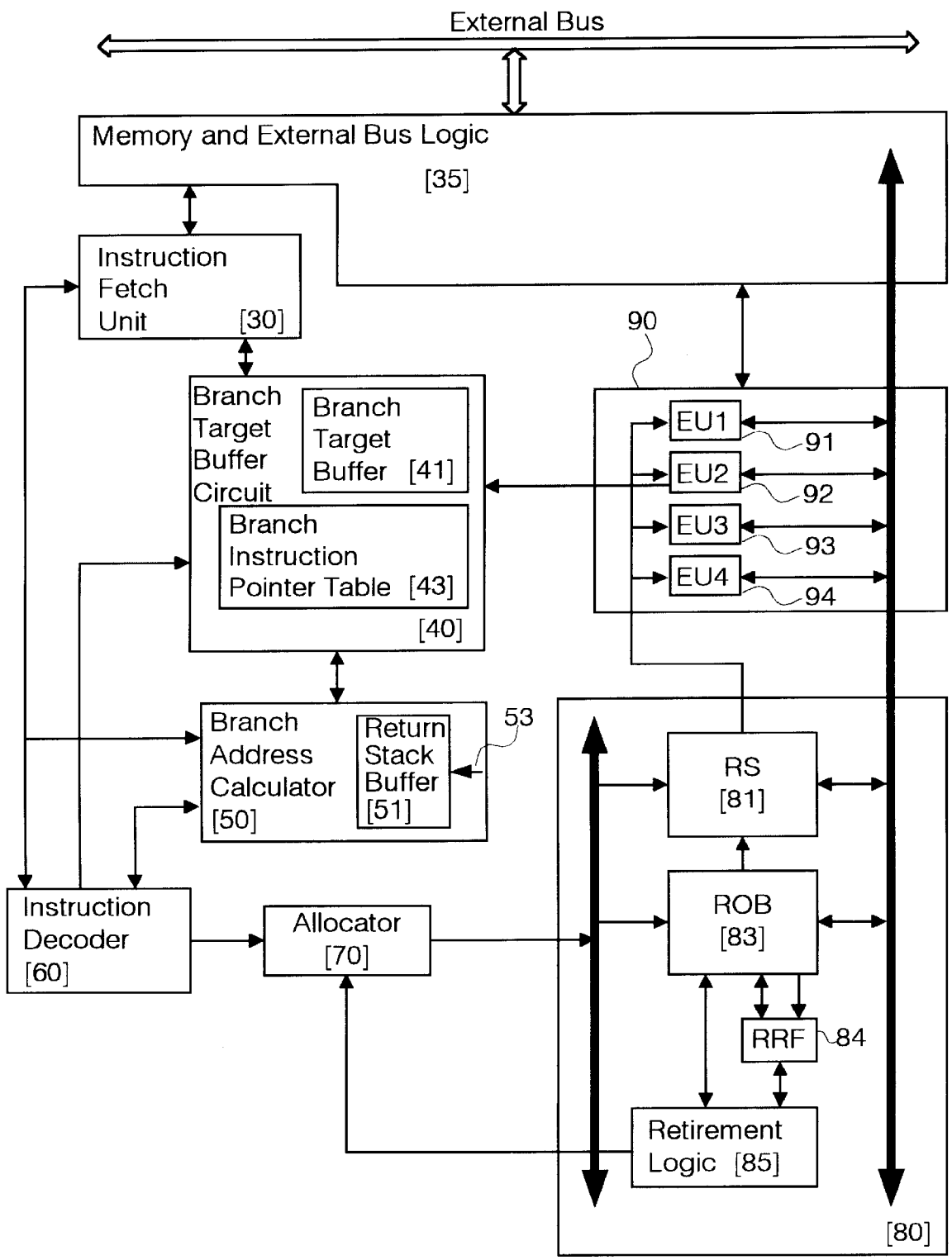
FIG. 7 is a block diagram of the microprocessor of FIG. 2 with the Branch IP Table added.

FIG. 6 illustrates the steps that a processor constructed with a Branch IP Table 43 as illustrated in FIG. 7 performs while processing branch instructions. At step 101, the microprocessor first makes a branch prediction. In the present embodiment, branch predictions are made by the Branch Target Buffer Circuit 40. Next, at steps 103 and 105, the Branch Address Calculator 50 verifies branch predictions made by the Branch Target Buffer Circuit 40. If it is determined that the Branch Target Buffer Circuit 40 mispredicted the branch, then the microprocessor flushes the pipeline and restarts the processor at the correct address.

If the Branch Address Calculator 50 does not detect a misprediction, then the NLIP address (the address of the instruction immediately following the branch instruction) and current processor state information are stored into the Branch IP Table at step 109. The branch micro-op then waits at the Reservation Station 81 until execution. Eventually, the branch micro-op executes at step 111 and, simultaneously, the stored branch information is read out of the Branch IP Table 43 by the Branch Target Buffer Circuit 40. At step 113, the branch prediction is compared with the resolved branch micro-op. If the branch prediction was predicted correctly then the branch history information stored in the Branch Target Buffer Circuit 41 entry is updated at step 115. If no entry for the branch instruction exists in the Branch Target Buffer Circuit 41, then the Branch Target Buffer Circuit 40 may allocate an entry for the branch instruction in the Branch Target Buffer Circuit 41 as dictated by an allocation policy.

However, if the branch was mispredicted then the Branch Execution Unit 92 determines if the branch instruction should have been taken at step 117. If the branch instruction should have been taken, then the microprocessor flushes the pipeline, restores the processor state from state information stored in the Branch IP Table 43, and restarts execution using the final branch target address determined by the Branch Execution Unit 92 at step 119. Alternatively, if the branch should not have been taken then the microprocessor flushes the pipeline, restores the processor state from processor state information stored in the Branch IP Table 43, and restarts execution using the NLIP address retrieved from the Branch IP Table 43 at step 121.

To further illustrate how the Branch IP Table 43 is used in the present invention, another example of branch instruction flowing through the microprocessor pipeline is presented with reference to FIG. 7.

When the Branch Target Buffer Circuit 40 predicts a branch instruction, the Branch Target Buffer Circuit 40 informs the Instruction Fetch Unit 30 of the branch prediction. The Instruction Fetch Unit 30 fetches subsequent instructions according to the branch prediction provided by the Branch Target Buffer Circuit 40. The Instruction Fetch Unit 30 passes the fetched branch instruction and the branch prediction made by the Branch Target Buffer Circuit 40 to the Instruction Decoder 60.

After the Instruction Decoder 60 receives the branch instruction, the Instruction Decoder 60 passes the branch target information of the branch and the branch prediction to the Branch Address Calculator 50. As explained in the previous section, the Branch Address Calculator 50 performs operations that verify branch predictions made by the Branch Target Buffer Circuit 40. Furthermore, in the present invention, the Branch Address Calculator 50 also calculates the address of the instruction immediately following the branch instruction (the NLIP address). After completing its operations, the Branch Address Calculator 50 returns the verified target address, the fall-through address, and the current value of the Top Of Stack (TOS) pointer for the Return Stack Buffer to the Instruction Decoder 60.

The Instruction Decoder 60 decodes the branch instruction into a micro-op and passes the branch micro-op to the Allocator 70. As the Instruction Decoder 60 passes the branch micro-op to the Allocator 70, the Allocator 70 assigns the next available pDst entry in the reorder buffer 83 to store the results of the branch micro-op. The Allocator 70 tells the Branch Target Buffer Circuit 40 which pDst entry number in the reorder buffer 83 was assigned to receive the micro-op results. Using the pDst entry number, the Branch Target Buffer Circuit 40 writes an entry in the Branch IP Table 43 that has the same entry number as the assigned pDst entry. The Instruction Decoder 60 sends the NLIP address to the Branch Target Buffer Circuit 40. The Branch Target Buffer Circuit 40 writes the NLIP address received from the Instruction Decoder 60 into the Branch IP Table 43.

Furthermore, a logic unit that has state information that should be preserved before commencing speculative execution writes the state information into the state information field of the Branch IP Table entry 43. In the present embodiment, the Instruction Decoder 60 sends the current value of the Top Of Stack (TOS) pointer 53 for the Return Stack Buffer to the Branch Target Buffer Circuit 40. The Branch Target Buffer Circuit 40 writes the Top Of Stack (TOS) pointer 53 into the state information field of the Branch IF Table 43.

While the NLIP address and any state information have been written to the Branch IP Table 43, the Allocator 70 allocates an entry in the reservation station 81 for the branch micro-op and places the branch micro-op into the reservation station 81 entry. The branch micro-op remains at the reservation station 81 entry until all the source data required to execute the branch micro-op has been obtained and the Branch Execution Unit 92 is available. When the source data required to execute the branch micro-op is ready, the reservation station 81 sends the branch micro-op to the Branch Execution Unit 92.

The Branch Target Buffer Circuit 40 monitors the bus used to send the branch micro-op from the reservation station 81 to the Branch Execution Unit 92. Upon seeing the reservation station 81 issue a branch micro-op to the Branch Execution Unit 92, the Branch Target Buffer Circuit 40 notes which pDst entry number in the reorder buffer 83 will be used to store the branch micro-op result. As the Branch Execution Unit 92 executes the branch micro-op, the Branch Target Buffer Circuit 40 reads out the entry in the Branch IP Table 43 having the same entry number as the reorder buffer entry. In this manner, the branch information associated with the branch micro-op being executed will be available when the branch micro-op is resolved.

The Branch Execution Unit 92 executes the branch micro-op to determine a final branch outcome (taken or not-taken) and a final branch target address. The Branch Execution Unit 92 compares the final outcome and branch target address with the predicted outcome and branch target address to see if the branch prediction was correct. If the branch prediction was correct, then the processor continues along the predicted path.

However, if the branch prediction was wrong, then the Branch Execution Unit 92 must flush the pipeline and restart the processor at the correct address. If the Branch Target Buffer Circuit 40 predicted an incorrect target address for a taken branch or if the branch was predicted not-taken and the final branch outcome was taken then execution should resume at the final branch target address. The Branch Execution Unit 92 handles this case by flushing the pipeline, and sending the final branch target address to the Instruction Fetch Unit 30.

Otherwise, if the branch was predicted taken and the final branch outcome was not-taken, the microprocessor must resume execution at the address of the instruction immediately following the branch instruction. The Branch Execution Unit 92 handles this by flushing the microprocessor pipeline and telling the Instruction Fetch Unit 30 to resume execution at the fall-through address as provided by the Branch IP Table 43.

In both misprediction cases, the Branch Target Buffer Circuit 40 sends the microprocessor state information stored in the Branch IP Table 43 to the units that stored microprocessor state information such that the microprocessor's state before the branch misprediction is restored. In the present embodiment, the Branch Target Buffer Circuit 40 sends the stored Top of Stack Pointer 53 value to the Branch Address Calculator 50 such that the Top of Stack Pointer 53 for the return stack buffer 51 is returned same position it was at before the processor started speculatively executing down the wrong path.

After the Branch Execution Unit 92 executes a branch micro-op, the Branch Target Buffer Circuit 40 should update/allocate the Branch Target Buffer Cache 41. Branches are stored in the Branch Target Buffer 40 by the address of the last byte of the branch instruction. To calculate the last byte of the branch instruction, the Branch Target Buffer Circuit 40 decrements the fall-through address obtained from the Branch IP Table 43. Using the decremented fall-through address, the Branch Target Buffer Circuit 40 updates/allocates the branch in the Branch Target Buffer Cache 41.

The foregoing has described a Branch IP Table for storing branch information about the branches that are in the microprocessor pipeline. It is contemplated that changes and modifications may be made by one of ordinary skill in the art, to the materials and arrangements of elements of the present invention without departing from the scope of the invention.

We claim:

1. A method for correcting execution flow after branch mispredictions in a pipelined computer processor, the method comprising of:
   predicting a branch instruction;
   fetching said branch instruction into said pipelined computer processor;
   decoding said branch instruction;
   storing said branch instruction in an entry of an N entry reorder buffer in preparation for execution, said execution possibly occurring out of original program order;
   storing misprediction correction information about said branch instruction into a branch entry in an N entry branch buffer that is separate and distinct from said reorder buffer, said branch buffer coupled to a instruction fetch unit such that said misprediction information is available in the case of a branch misprediction, said branch entry associated with said branch instruction in said entry in said N entry reorder buffer; and
   using said misprediction correction information to correct execution flow when a branch instruction is mispredicted.

2. The method of claim 1 wherein said storing misprediction correction information about said branch instruction further comprises storing a processor state value into said branch buffer, said processor state value comprising a state of said computer processor when said associated branch instruction was predicted.

3. The method of claim 2 wherein said processor state value comprises a value of a pointer into a return stack buffer.

4. The method of claim 1 wherein said misprediction correction information comprises an address directly related to an address of said branch instruction.

5. The method of claim 4 wherein said address directly related to an address of said branch instruction comprises a memory address of an instruction immediately following said associated branch instruction.

6. A computer processor for executing a plurality of computer instructions, said computer processor comprising the elements of:
   a branch prediction mechanism, said branch prediction mechanism predicting the occurrence and branch outcome of branch instructions within said plurality of computer instructions;
   a reorder buffer, said reorder buffer containing N entries that store instructions within said computer processor;
   a Branch IP Table, said Branch IP Table coupled to and located proximate to said branch prediction mechanism, said Branch IP Table comprising N branch entries wherein each branch entry is associated with a corresponding entry that may contain a branch instruction in said reorder buffer, each of said N branch entries comprising
      an instruction pointer address field, said pointer address field for storing an address directly related to a memory address of said associated branch instruction;
      a processor state value field, said processor state value field for storing a state of said processor when said branch outcome of associated branch instruction was predicted; and
   a Branch Execution Unit, said Branch Execution Unit executing said branch instructions out of original program order, said Branch Execution Unit restoring said state of said processor stored in said Branch IP Table when a branch misprediction occurs, said Branch Execution Unit resuming execution at said address of said instruction immediately following said associated branch instruction if said branch misprediction predicted taken.

7. The computer processor for executing a plurality of computer instructions as claimed in claim 6 wherein said processor state value comprises a value of a pointer into a return stack buffer.

8. The computer processor for executing a plurality of computer instructions as claimed in claim 6 wherein said branch entries in said Branch IP Table are filled after a branch prediction has been made for a branch instruction by said branch prediction mechanism.

9. The computer processor for executing a plurality of computer instructions as claimed in claim 6 further comprising an instruction decoder and wherein said branch entries in said Branch IP Table are filled when said branch instruction is decoded by said instruction decoder.

10. A pipelined computer processor comprising:
   a branch target buffer circuit, said branch target buffer circuit predicting existence of branch instructions within an instruction stream and predicting outcome of said branch instructions, and storing information about said branch instructions for future reference;

a Branch IP Table, said Branch IP Table coupled to and located proximate to said branch target buffer circuit, and said Branch IP Table comprising a buffer of N branch buffer entries storing information about a plurality of unresolved branch instructions currently within said processor; and an execution unit, said execution unit coupled to said branch target buffer circuit and executing said branch instructions to determine a final branch outcome and a final branch target address.

11. The processor as claimed in claim 10 further comprising an instruction fetch unit coupled to and located proximate to said branch target buffer circuit, said instruction fetch unit normally fetching instructions sequentially and said instruction fetch unit fetching instructions from a branch target address provided by said branch target buffer circuit when said branch target buffer circuit predicts a branch taken.

12. The processor as claimed in claim 10 further comprising an N entry reorder buffer, said reorder buffer coupled to said execution unit, and said reorder buffer storing a plurality of instructions that may be executed out of original program order.

13. The processor as claimed in claim 12 wherein each branch buffer entry directly corresponds to an entry in said reorder buffer storing a branch instruction and stores an address directly related to a memory address of said branch instruction.

14. The processor as claimed in claim 10 wherein each branch buffer entry comprises an instruction pointer address field, said instruction pointer address field for storing an address directly related to a memory address of one of said unresolved branch instructions.

15. The processor as claimed in claim 14 wherein said instruction pointer address field comprises a next linear instruction pointer address, said next linear instruction pointer address comprising an address of an instruction immediately following one of said unresolved branch instruction.

16. The processor as claimed in claim 10 wherein each branch buffer entry comprises a processor state value field, said processor state value field for storing information describing a state of said pipelined computer processor when one of said unresolved branch instructions was predicted.

17. The processor as claimed in claim 16 wherein said information describing a state of said pipelined computer processor comprises a pointer into a return stack buffer.

18. A computer processor for executing a plurality of computer instructions, said computer processor comprising the elements of:

a branch prediction circuit comprising a branch prediction mechanism, said branch prediction mechanism predicting the occurrence and branch outcome of branch instructions within said plurality of computer instructions;

a Branch IP Table, said Branch IP Table coupled to and located proximate to said branch prediction mechanism, said Branch IP Table comprising N branch entries wherein each branch entry is associated with an entry in said reorder buffer that may contain a branch instruction, each of said N branch entries comprising an instruction pointer address field, said pointer address field for storing an address directly related to a memory address of said associated branch instruction;

a processor state value field, said processor state value field for storing a state of said processor when said branch outcome of associated branch instruction was predicted;

a reorder buffer, said reorder buffer containing N entries that store instructions within said computer processor; and a Branch Execution Unit, said Branch Execution Unit executing said branch instructions out of original program order, said Branch Execution Unit restoring said state of said processor stored in said Branch IP Table when a branch misprediction occurs, said Branch Execution Unit resuming execution at said address of said instruction immediately following said associated branch instruction if said branch misprediction predicted taken.

19. The computer processor for executing a plurality of computer instructions as claimed in claim 18 wherein said processor state value comprises a value of a pointer into a return stack buffer.

20. The computer processor for executing a plurality of computer instructions as claimed in claim 18 wherein said branch entries in said Branch IP Table are filled after a branch prediction has been made for said associated branch instruction by said branch prediction mechanism.

* * * * *